United States Patent [15] 3,687,902

Perrino et al. [45] Aug. 29, 1972

[54] POLYUREAS OBTAINED BY REACTING TOLUENE DIISOCYANATE WITH AB,B-BIS(ALKYLAMINO)DIETHYLSULFONE

[72] Inventors: Albert C. Perrino, 2579 Cranston St., Cranston, R.I. 02920; Michael G. Israel, 2928 Pawtucket Ave., East Providence, R.I. 02860

[22] Filed: June 1, 1970

[21] Appl. No.: 62,120

Related U.S. Application Data

[62] Division of Ser. No. 720,384, April 10, 1968, Pat. No. 3,576,879.

[52] U.S. Cl. .................260/77.5 CH, 260/77.5 R
[51] Int. Cl. ..................................................C08g 22/02
[58] Field of Search ............................260/77.5 CH

[56] References Cited

UNITED STATES PATENTS

| | | |
|---|---|---|
| 2,988,538 | 6/1961 | Thoma et al..............260/77.5 |
| 3,355,435 | 11/1967 | Finelli.........................260/75 |
| 3,475,377 | 10/1969 | Rosendahl et al. ..........260/75 |

FOREIGN PATENTS OR APPLICATIONS

| | | |
|---|---|---|
| 13,996 | 6/1968 | Japan..................260/77.5 UX |
| 1,469,457 | 2/1967 | France...............260/77.5 UX |

*Primary Examiner*—Donald E. Czaja
*Assistant Examiner*—H. S. Cockeram
*Attorney*—Cushman, Darby & Cushman

[57] ABSTRACT

$\beta,\beta'$-bis(alkylamino) diethyl sulfones and polyamides and polyureas obtained therefrom.

1 Claim, No Drawings

3,687,902

POLYUREAS OBTAINED BY REACTING TOLUENE DIISOCYANATE WITH Αβ,β-BIS(ALKYLAMINO)DIETHYLSULFONE

This is a division of our copending application Serial No. 720,384, filed Apr. 10, 1968, and now U.S. Pat. 3,576,879.

The present invention relates to certain novel β,β'-bis (alkylamino) diethyl sulfones and methods for preparing the same. These sulfones are valuable intermediates, exhibiting reactivity common to difunctional secondary amines, for the preparation of many useful derivatives and polymers. Further, these compounds are attractive, in view of their chemical structure, as potential biologically active materials.

The sulfones of the invention may be structurally illustrated as follows:

wherein $R_1$ is a $C_1$ to $C_{18}$ alkyl, straight or branched chain and substituted or unsubstituted, and $R_2$ is hydrogen or methyl. These products are bis-adducts obtained by reacting a divinyl sulfone, or a diallyl sulfone, with the appropriate primary amine according to the reaction:

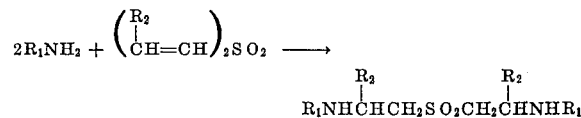

wherein $R_1$ and $R_2$ have the meanings stated above. Suitable primary amines for use in the abovenoted reaction are the straight- or branch-chain alkylamines containing up to 18 carbon atoms, e.g. methyl-, ethyl-, n-propyl-, isopropyl-, n-butyl-, sec-butyl-, t-butyl-, n-amyl-, octyl-, t-octyl-, and octadecyl-amines; and the hydroxyalkyl- and alkoxyalkyl- counterparts thereof, e.g. 2-hydroxyethylamine, 2-hydroxypropylamine, 3-hydroxypropylamine, 3-methoxypropylamine and the like. Diamines, e.g. N,N-diethylethylenediamine, may also be used.

The invention is based on the surprising discovery that bis-adducts of the type indicated can be obtained by the reaction of primary aliphatic amines with divinyl sulfone or diallyl sulfone. It is, for example, well known that 4-alkylthiomorpholine-1,1-dioxides can be prepared by the reaction of primary aliphatic amines with divinyl sulfone. In general, the preparation of 4-alkylthiomorpholine-1,1-dioxides is effected by the dropwise addition of divinyl sulfone to a primary aliphatic amine. A solvent, such as alcohol or water, in which both reactants are soluble, provides a homogeneous reaction mixture and in the case of low molecular weight amines the reaction is exothermic according to the following equation:

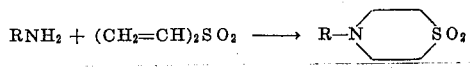

The products from such reactions can be isolated by standard procedures and are obtained in essentially quantitative yields. In view of this, it is highly unexpected to find that alternative products, more particularly bis-adducts, can also be obtained in essentially quantitative yields from the reaction of divinyl sulfone or diallyl sulfone with primary aliphatic amines.

In preparing the sulfones of the invention, it is preferred to use a 2:1 mole ratio of the amine to divinyl sulfone (or diallyl sulfone). However, excellent yields may be obtained using any mol ratio of amine to sulfone ranging from 2:1 to as high as 20:1, excess amine functioning as solvent. Common organic solvents, such as methanol, ethanol, benzene, toluene or petroleum ether may also be used if desired. However, a non-polar organic solvent, such as toluene or petroleum ether, in which one or both of the reactants is insoluble, is preferred. The reaction can be carried out at temperatures ranging from −45°C. to 65°C depending upon the reactivity of the amine and the solvent system used. With a two phase reaction mixture, temperatures of 0°C. to 10°C. give excellent yields with the more reactive primary amines; while somewhat higher temperatures may be used to complete the reaction with less reactive amines.

According to a further feature of the invention, the β,β'-bis(alkylamino) diethyl sulfones are converted to the various derivatives characteristic of secondary amines. For example, quaternary salts may be prepared and typical of this is the preparation of the corresponding dihydrochloride salts by treatment with concentrated hydrochloric acid or anhydrous hydrogen chloride in a common organic solvent as generalized by the following equation:

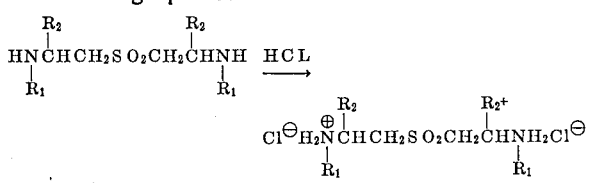

wherein $R_1$ and $R_2$ have the meanings indicated above.

In still another embodiment of the invention, the β,β'-bis-(alkylamino) diethyl sulfones are reacted with dibasic acid chlorides and diisocyanates to provide novel and useful polyamides and polyureas. For example, the polyamides may be prepared by reaction of the sulfones with adipylchloride, sebacyl chloride, or terephthaloyl chloride. Typically, an interfacial polymerization may be carried out using a Waring Blendor (chloroform/water, molar ratio sulfone/acid chloride of I. 2/1, sodium hydroxide or sodium carbonate as acid acceptor). In general polyamides, prepared from sulfones with simple alkylamino moieties, exhibit excellent adhesive properties while the polyamides, prepared from sulfones with hydroxyalkylamino moieties, exhibit rubber-like properties. The repeating unit of these polymers is represented below with the understanding that this unit will be modified to reflect polyester cross-linking when $R_1$ contains hydroxyl groups:

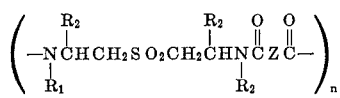

where $R_1$ and $R_2$ have the meanings stated above; Z is chosen from the group consisting of alkylene chains containing two to eight carbon atoms and simple arylene groups, e.g. phenylene; and n represents the number of repeating units and may be a value in the range of 2 to 100.

It is also possible to prepare a highly useful series of polyureas by reaction of toluene diisocyanate with the present sulfones, advantageously carried out in the presence of a solvent such as dimethylformamide. Such polyureas are solid resins which exhibit good film forming and adhesive properties and may be represented by the following formula:

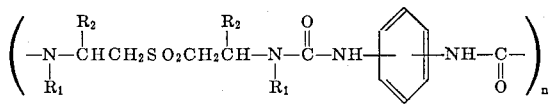

where $R_1$, $R_2$, and n have the meanings stated above.

The invention is illustrated, but not limited, by the following examples:

EXAMPLE 1

$\beta,\beta'$-bis(2-hydroxyethylamino) diethyl sulfone

To a stirred solution of 30.5 g (0.5 mole) ethanolamine in 100 ml. ethanol cooled to −45°C., in a 250 ml. 3-necked round bottom flask equipped with Y-tube, thermometer, dropping funnel, condenser, and stirrer, was added dropwise a solution of 29.5 g. (0.25 mole) divinyl sulfone in 60 ml. ethanol. The temperature of the reaction mixture was maintained between −45°C and −35°C throughout the 40 minute addition period and then raised to 0°C. The precipitate was collected by suction filtration, recrystallized from ethanol, and dried; mp 103°–105°C., yield 41 g. (89 percent).
Calculated for $C_8H_{20}N_2O_4S$: %C, 39.98; %H, 8.39; %N, 11.66
Found: %C, 40.23; %H, 8.54; %N, 11.62.

The corresponding dihydrochloride was prepared by treating the sulfone (6.0 g.) dissolved in 10 ml. of water with concentrated hydrochloric acid (8.0 g.) at 20 – 25°C. The water was removed by azeotropic distillation with toluene and the precipitate which formed was collected by suction filtration and washed with ethanol; yield 7.65 g. (97 percent). Following recrystallization from aqueous ethanol the dihydrochloride exhibited a melting point of 172°–173°C.
Calculated for $C_8H_{22}Cl_2N_2O_4S$: %C, 30.67; %H, 7.03; %N, 8.95.
Found: %C, 30.80; %H 7.19; %N, 8.89.

The interfacial polymerization of $\beta,\beta'$-bis(2-hydroxyethylamino) diethyl sulfone and sebacyl chloride was carried out in a Waring Blendor. The blender was charged with a solution of 6.0 g. (0.025 mole) of the sulfone and 5.3 g. (0.05 mole) sodium carbonate in 125 ml. water. A solution of 5.98 g (0.021 mole) sebacyl chloride in 40 ml. chloroform was added with rapid agitation and the mixture was stirred for 16 minutes, during which time a mild exotherm was observed. The product was separated by decantation; washed with water, ethanol, and acetone; and dried. The polyamide, which exhibited rubber-like properties, was insoluble in toluene, nitrobenzene, dimethyl sulfoxide, and dimethylformamide. Upon heating to 250°C., the polymer gradually hardened and darkened in color.

Polyamides with similar properties were obtained by reaction of the title sulfone with adipyl chloride and terephthaloyl chloride in the manner described.

EXAMPLE 2

$\beta,\beta'$-bis(2-hydroxypropylamino) diethyl sulfone

To a stirred suspension of 19 g. (0.25 mole) 2-hydroxypropylamine and 100 ml. toluene cooled to 0°C., in a 250 ml. 3-necked round bottom flask equipped with Y-tube, thermometer, dropping funnel, condenser and stirrer was added dropwise a solution of 15 g. (0.125 mole) divinyl sulfone in 50 ml. toluene. The temperature of the reaction mixture was maintained at 0°–5°C., throughout the 30 minute addition period and for 1 hour thereafter. The precipitate which formed was collected by suction filtration, recrystallized from ethanol, and dried; mp 95°–95.6°C., yield 24.5 g. (73 percent).
Calculated for $C_{10}H_{24}N_2O_4S$: %C, 44.78; %H, 8.95; %N, 10.45.
Found: %C, 44.74; %H, 8.82; %N, 10.28.

The corresponding dihydrochloride prepared as described in Example 1 was obtained in 94 percent yield, mp. 194°–196°C.
Calculated for $C_{10}H_{26}Cl_2N_2O_4S$: %C, 35.19; %H, 7.63; %N, 8.21,
%C, 35.02; %H, 7.78, %N 8.20.

EXAMPLE 3

$\beta,\beta'$-bis(3-hydroxypropylamino) diethyl sulfone

The reaction of 3-hydroxypropylamine and divinyl sulfone (2:1 molar ratio) was carried out in the same manner described in Example 2. The product was obtained in 64.4 percent yield, m.p. 82°–84°C.
Calculated for $C_{10}H_{24}N_2O_4S$: %C, 44.78; %H, 8.95; %N, 10.45.
Found: %C, 45.04; %H, 8.84; %N, 10.39.

The dihydrochloride of the sulfone was prepared as described in Example 1: yield 96 percent, m.p. 162°–164°C.
Calculated for $C_{10}H_{26}Cl_2N_2O_4S$: %C, 35.19; %H, 7.63; %N, 8.21,
Found: %C, 35.34; %H, 7.72; %N, 8.11.

EXAMPLE 4

$\beta,\beta'$-bis (n-butylamino) diethyl sulfone

To a stirred mixture of 14.8 g. (0.125 mole) divinyl sulfone and 125 ml. petroleum ether (30°–60°C boiling range) cooled to −10°C., in a 250 ml., three-necked, round bottom flask equipped with Y-tube, thermometer, dropping funnel, condenser and stirrer was added 18.2 g. (0.25 mole) n-butylamine dropwise during a 1 hour period. The reaction temperature was maintained between −10°C and −5°C., throughout the addition after which stirring was continued for an additional hour at the same temperature. The petroleum ether was removed at aspirator pressure leaving the title sulfone as a colorless oil.

The corresponding dihydrochloride was prepared by treating a 10 g. sample of the sulfone dissolved in 100 ml. ethanol/ether (50/50) with anhydrous hydrogen chloride until the mixture remained acidic. The white precipitate was collected, washed with 2 × 100 ml. portions of fresh ether and air dried: yield 10 g. (83 percent), dec. 252°C., following recrystallization from aqueous ethanol.
Calculated for $C_{12}H_{30}Cl_2N_2O_2S$: %C, 42.734 %H, 8.90; %N, 8.31.
Found: %C, 42.57; %H, 8.93, %N, 8.00.

The interfacial polymerization of β,β'-bis (n-butylamino) diethyl sulfone and sebacyl chloride was carried out in a Waring Blendor. The blender was charged with 13.2 g. (.05 mole) of the sulfone dissolved in 25 ml. chloroform, 20 ml. of a 5 percent Dupanol ME solution, and 4 g. sodium hydroxide dissolved in 150 ml. water. To this mixture was added a solution of 12 g. (0.05 mole) sebacyl chloride in 25 ml. chloroform with rapid agitation. Following a 10 minute reaction period, during which time a mild exotherm was observed, the mixture was poured into one l. cold water, the chloroform was boiled off, and the polymer was separated by decantation and dried in a vacuum oven at 80°C for 2 hours; yield 19 g. (89 percent). The polymer dried to a pale yellow transparent film exhibiting excellent adhesion properties.

EXAMPLE 5

β,β'-bis (3-methoxypropylamino) diethyl sulfone

Preparation of this sulfone was carried out in the manner described in Example 4.

Conversion to the corresponding dihydrochloride was effected with an overall yield of 81 percent m.p. 226°–227.5°C. following recrystallization from aqueous ethanol.

Calculated for $C_{12}H_{30}Cl_2N_2O_4S$: %C, 39.02; %H, 8.13; %N, 7.59.

Found: %C, 38.89; %H. 8.11; %N, 7.65.

The polymerization of β,β'-bis-(3-methoxypropylamino) diethyl sulfone and toluene diisocyanate was carried out in a 250 ml. three-necked round bottom flask fitted with thermometer, stirrer, and open end addition tube. To a rapidly stirred solution of 14.8 g. (0.05 mole) sulfone in 50 ml. dimethylformamide was added in one portion a freshly prepared solution of 8.7 g. (0.05 mole) toluene diisocyanate in 50 ml. dimethylformamide causing the temperature to rise from 25°to 50°C. After stirring for 30 minutes, the reaction mixture was poured into 1 l. of water with rapid agitation. The resulting tacky amorphous solid was collected by suction filtration, and dried in a vacuum oven at 100°C.; yield 16 g. (68 percent). The resin dried to a pale yellow transparent film exhibiting excellent adhesion properties.

EXAMPLE 6

β,β'-bis (N,N-diethylethylenediamino) diethyl sulfone

This sulfone was prepared in the manner described in Example 4. Conversion to the corresponding tetrahydrochloride was carried out with an overall yield of 74 percent, dec. 195°C.

Calculated for $C_{16}H_{42}Cl_4N_4O_2S$: %C, 38.71; %H, 8.47; %N, 11.29.

Found: %C, 38.61; %H, 8.38; %N, 11.08.

Preparation of a polyamide with the sulfone and sebacyl chloride was carried out in the manner described in Example 4. Similarly, this resin exhibited excellent adhesive properties.

EXAMPLE 7

β,β'-bis(n-propylamino) diethyl sulfone

This sulfone was prepared in the same manner described in Example 4. The corresponding dihydrochloride was obtained in 73 percent yield from starting material, dec. 235°C.

Calculated for $C_{10}H_{26}Cl_2N_2O_2S$: %C, 38.83; %H, 8.41; %N, 9.06.

Found: %C, 38.96; %H, 8.36; %N, 9.13.

EXAMPLE 8

β,β'-bis-(t-butylamino) diethyl sulfone

This sulfone was prepared in the same manner described in Example 4. The corresponding dihydrochloride was obtained with an overall yield of 84.5%, 242°C. dec.

Calculated for $C_{12}H_{30}Cl_2N_2O_2S$: %C, 42.73; %H, 8.90; %N, 8.31.

Found: %C, 42.43; %H, 9.03; %N, 8.35.

EXAMPLE 9

β,β'-bis(t-octylamino) diethyl sulfone

This sulfone was prepared in the same manner described in Example 4, as a colorless oil. The corresponding hydrochloride was obtained in 90 percent yield for the two reactions, 197°C. dec.

Calculated for $C_{20}H_{46}Cl_2N_2O_2S$: %C, 53.45; %H, 10.24; %N, 6.24.

Found: %C, 53.55; %H, 10.21; %N, 6.43.

EXAMPLE 10

β,β'-bis(octadecylamino) diethyl sulfone

In a 250 ml. three-necked round bottom flask fitted with Y-tube, thermometer, condenser, stirrer, and straight addition tube was placed 7.4 g. (.063 mole) divinyl sulfone and 100 ml. petroleum ether (30°–60°C. boiling range). To the rapidly stirred mixture cooled to 0°C. was added 33.6 (0.125 mole) powdered octadecylamine in small portions during a 30 minute period. The temperature was maintained between 0°–5 °C. throughout the addition period, after which the temperature was permitted to rise to room temperature (one hour) and finally raised 60°C. for 1 hour. The product was collected by suction filtration, washed with diethyl ether and recrystallized from ethanol; 41 g. (94 percent), m.p. 88°–90°C.

Calculated for $C_{40}H_{84}N_2O_2S$: %C, 73.06; %H, 12.94; %N, 4.26.

Found: %C, 72.03; %H, 12.44; %N, 3.94.

A 10 g. sample of the resulting β,β'-bis (octadecylamino) diethyl sulfone was suspended in 100 ml. ethanol/ether (50/50) and treated with anhydrous hydrogen chloride until the mixture remained acidic. The solid was collected and digested three times with 100 ml. portions of ethanol and filtered hot. Thus, the dihydrochloride was obtained in 99 percent yield, m.p. 224°–226°C.

Calculated for $C_{40}H_{86}Cl_2N_2O_2S$: %C, 65.75; %H, 11.92; %N, 3.84.

Found: %C, 65.57; %H, 11.79; %N, 3.6%.

Preparation of a polyurea with the sulfone and toluene diisocyanate was carried out in the manner described in Example 5. Similarly the resin obtained exhibited excellent film forming and adhesive properties.

EXAMPLE 11

β,β'-bis(methylamino) diethyl sulfone

In a 250 ml. three-necked round bottom flask fitted with stirrer, two Y-tubes, thermometer, condenser, dropping funnel, and gas addition tube was placed 150 ml. petroleum ether (30°–60°C boiling range) cooled to −10°C. Methyl-amine was added continuously via the gas delivery tube while 15 g. (0.125 mole) divinyl sulfone was added dropwise during a 1 hour period. The temperature was maintained between −10°C. and −5°C. throughout this addition and the subsequent treatment with acid. Excess concentrated hydrochloric acid was added dropwise with vigorous agitation of the heterogeneous mixture. The organic solvent was removed at aspirator pressure after which water was removed by azeotropic distillation with benzene. The precipitate was collected by suction filtration and subjected to continuous extraction with ethanol in a Soxhelet for 40 hours. The dihydrochloride of the sulfone remained after extraction; yield 10.7 g. (35 percent), 230°C. dec.

Calculated for $C_6H_{18}Cl_2N_2O_2S$: %C, 28.46; %H, 7.11; %N, 11.07.

Found: %C, 28.60; %H, 7.25; %N, 10.90.

It will be recognized that various modifications may be made in the invention described herein without deviating from the scope thereof as set forth in the following claims wherein:

We claim:

1. A film-forming polyurea consisting essentially of the recurring unit

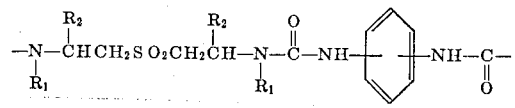

wherein $R_1$ is unsubstituted alkyl, hydroxyalkyl, alkoxyalkyl or alkyl substituted aminoalkyl, the total number of carbon atoms in $R_1$ being in the range of 1–18 and $R_2$ is hydrogen or methyl.

* * * * *